Aug. 30, 1938.　　R. D. HAYCOCK ET AL　　2,128,532
LAND LEVELER
Filed May 20, 1937　　2 Sheets-Sheet 1
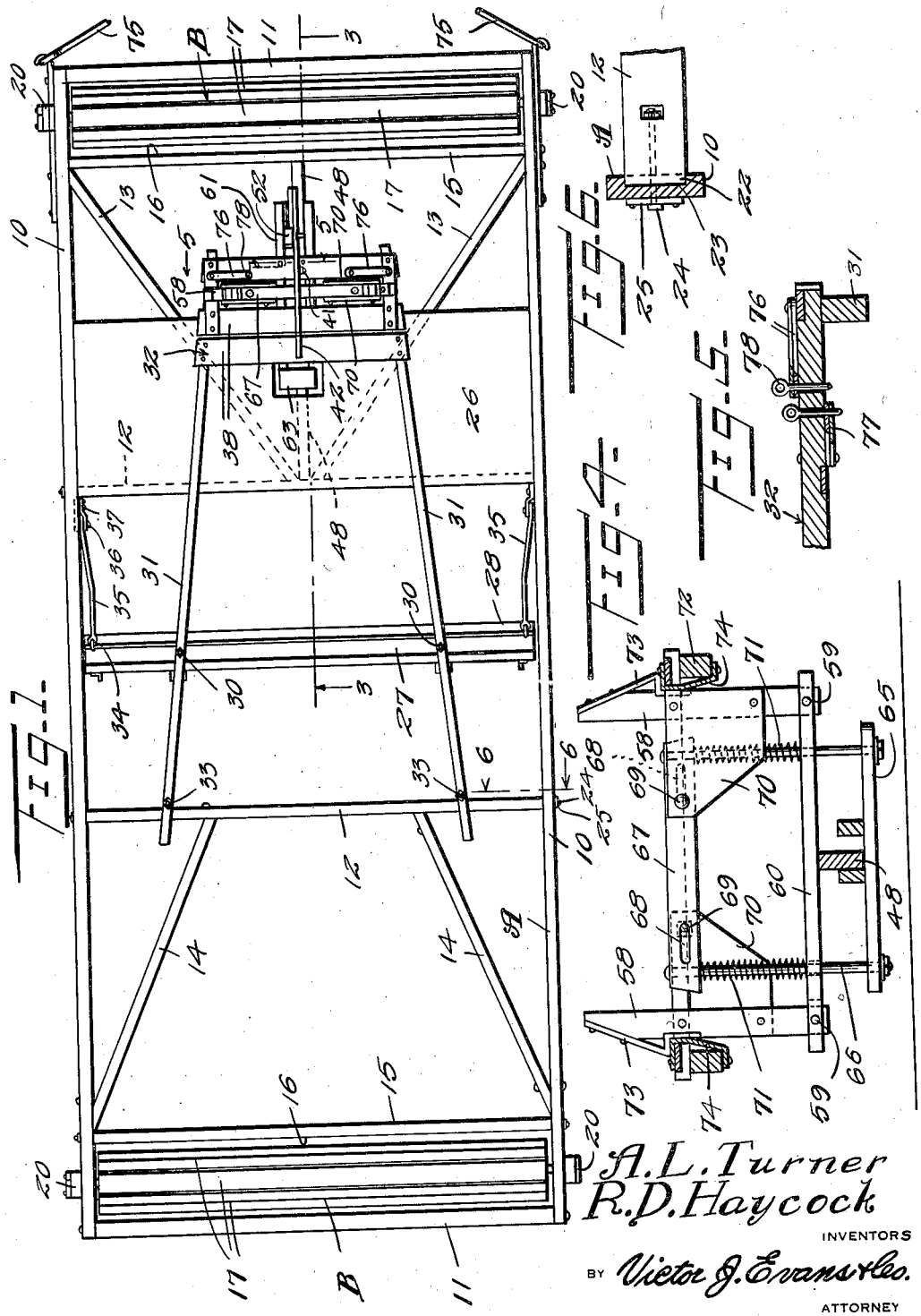
A.L.Turner
R.D.Haycock
INVENTORS
BY Victor J.Evans&Co.
ATTORNEY

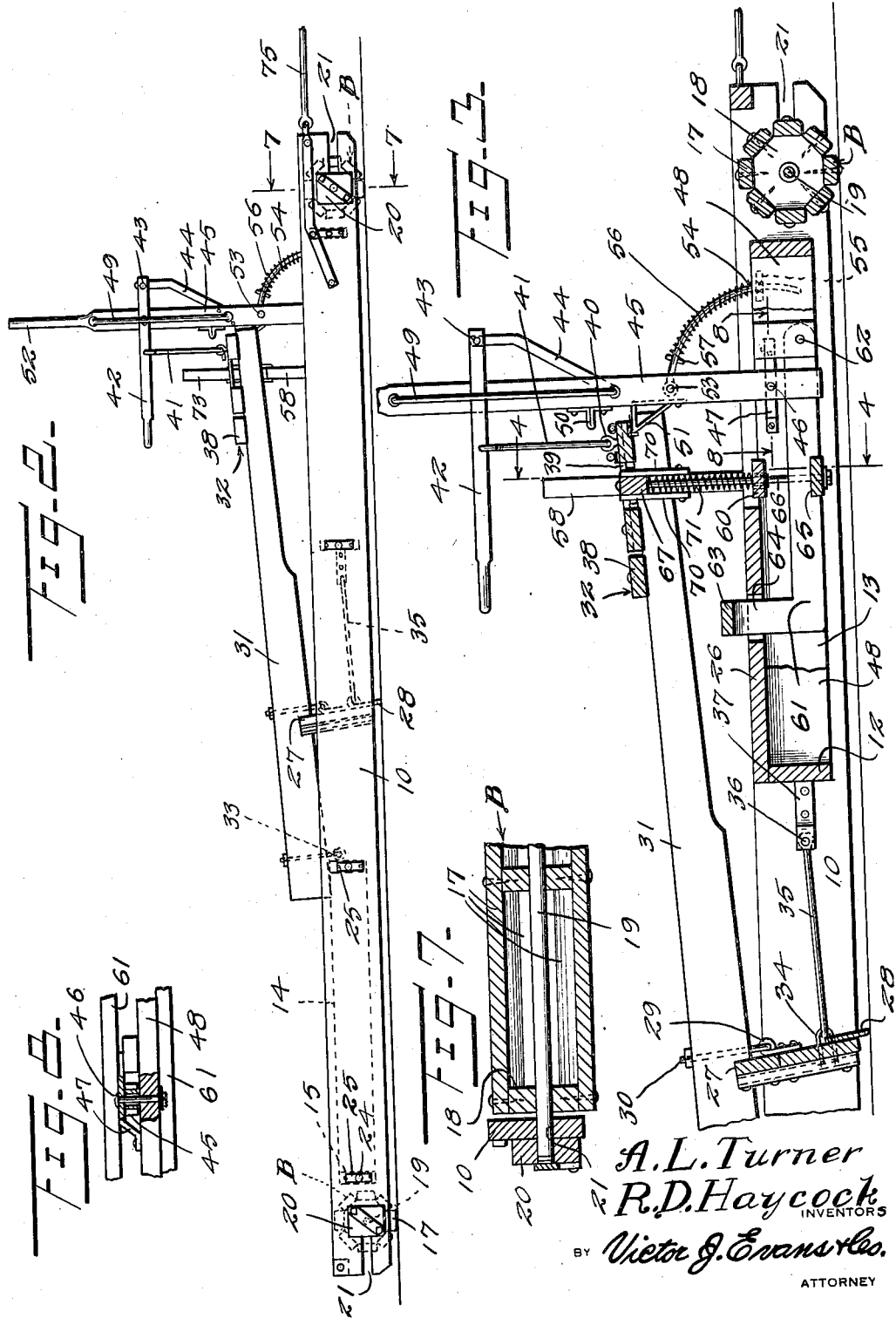

Patented Aug. 30, 1938

2,128,532

UNITED STATES PATENT OFFICE 2,128,532

LAND LEVELER

Rex D. Haycock, Zurich, Mont., and Alma L. Turner, Declo, Idaho

Application May 20, 1937, Serial No. 143,816

6 Claims. (Cl. 37—146)

The invention relates to a ground working machine and more especially to a land leveler.

The primary object of the invention is the provision of a leveler of this character, wherein ground rollers of a particular construction are journaled in the main frame at opposite ends thereof so that the said frame will be held elevated from the ground surface a determined distance and these rollers avoid any possibility of digging into the earth when the leveler is advanced with the result that such leveler is assured of easy draft and efficiency in the working thereof.

Another object of the invention is the provision of a leveler of this character, wherein a scraper is supported in a novel manner and is susceptible of vertical adjustment so that the same can be moved clear of the ground surface or brought into scraping position with respect thereto and held in these positions, the adjustment of the scraper being effected in a simplified and novel manner.

A further object of the invention is the provision of a leveler of this character, wherein the scraper is mounted within the frame and is carried by a treadle coacting with a foot pedal and a hand controlled lever so that the scraper can be conveniently brought to ground working position or elevated to an inoperative position and when in ground working position will be latched securely for the leveling of land under advancement of the machine.

A still further object of the invention is the provision of a leveler of this character, which is comparatively simple in construction, thoroughly reliable and efficient in operation, easy in the handling thereof, assured of smooth draft, strong, and comparatively inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a machine constructed in accordance with the invention.

Figure 2 is a side elevation thereof.

Figure 3 is a fragmentary vertical longitudinal sectional view taken on the line 3—3 of Figure 1 looking in the direction of the arrows.

Figure 4 is a sectional view taken on the line 4—4 of Figure 3 looking in the direction of the arrows.

Figure 5 is a fragmentary detail sectional view on the line 5—5 of Figure 1 looking in the direction of the arrows.

Figure 6 is a fragmentary detail sectional view taken on the line 6—6 of Figure 1 looking in the direction of the arrows.

Figure 7 is a sectional view on the line 7—7 of Figure 2 looking in the direction of the arrows.

Figure 8 is a sectional view on the line 8—8 of Figure 3 looking in the direction of the arrows.

Similiar reference characters indicate corresponding parts throughout the several views in the drawings.

Referring to the drawings in detail, the land leveler constituting the present invention comprises a main frame A involving spaced side sills 10, opposite end pieces 11, intermediate cross pieces 12 and diagonally disposed front and rear pairs of braces 13 and 14, respectively. Removed inwardly from the end pieces 11 between the side sills 10 of the frame A are supplemental end pieces 15, these being parallel with the said pieces 11 and provide spaces 16 accommodating traction rollers B. Each traction roller B is composed of a plurality of tread slats 17 nailed or otherwise secured to outer and inner substantially octagon shaped hub members 18 centrally journaled upon an axle 19, each end being removably fitted in an axle boxing 20 carried exteriorly of the frame A upon an adjacent side sill 10 thereof. It is preferable to have each side sill 10 at opposite ends thereof slotted at 21 affording entrance clearances for the axles 19 of the rollers B. These rollers B when journaled with the frame are of a diameter in cross section and set in said frame to hold the latter raised from the ground surface the required or determined height or distance.

The end pieces 11, intermediate cross pieces 12 and auxiliary end pieces 15 are tenoned in a mortice 23, the latter being in the side sill 10 as is shown in Figure 6 of the drawings, there being fitted at this tenoned and morticed joint 22 and 23 a tie fastener 24 which separably secures the interfitted parts together. The fastener 24 at its head end engages with a reinforcing strap iron 25 suitably fastened exteriorly to the sill 10 to eliminate the gnawing of this fastener through the sill adjacent thereto.

Built into the frame A adjacent its front or forward draft end is a platform 26 preferably supported upon an adjacent cross piece 12 and the diagonal braces 13 in said frame. Rearwardly with respect to the platform 26 is a forwardly inclined adjustable scraper blade carrier 27 having thereon at its lower edge a scraper blade 28 and fixed at the proper locations on this carrier 27 are eyes 29 with which are loosely connected hangers 30 fastened in forwardly convergent side arms 31 of a foot treadle 32 and such arms near their rearmost ends are linked at 33 to a cross piece 12 of the frame A for vertical swinging of said treadle, the arms 31 being in overriding relation to the said cross piece 12 with which the treadle has linkage connection. The blade carrier 27 close to the lower edge thereof has fitted therein staples 34 to which are loosely connected draft links 35, these being pivoted at 36 to fixed brackets 37 on the sills 10 ahead of the said carrier.

The treadle 32 carries forwardly thereof tread planks 38 arranged to provide a clearance 39, one plank 38 being fitted with an eye 40 to which is loosely connected a lifter link 41 connected with a lifter lever 42 pivoted at 43 to a bracket 44 rigidly carried upon an upstanding tilting post 45 which near its lower end is pivoted at 46 by a fixture 47 beneath the platform plane 48. The longitudinal centrally located rib piece 48. The post 45 carries a guide 49 for the lever 42 and by the latter under operation of the same the treadle 32 can be raised when the same is freed from a latching mechanism hereinafter fully described.

Carried by the post 45 are upper and lower keepers 50 and 51, respectively, suitably spaced from each other and these are adapted to be engaged by the treadle 32 for sustaining the same in two positions. In one position, that is to say, when this treadle 32 engages with the keeper 51 the scraper blade 28 is in ground engaging and working position and when the treadle 32 engages with the keeper 50 the scraper blade is in inactive position or out of ground working activity. The post 45 at its upper end is formed with a handle or grip 52 while pivoted to the said post at 53 is a spring tensioning device involving an arcuate shaped plunger 54 working through a guide 55 and a coiled compression spring 56 which is about said plunger 54 resting against an abutment 57 thereon and the guide 55, respectively, the purpose of the tensioning device being to hold the post 45 normally in a position to have one or the other of the keepers 50 and 51 latched with the treadle 32, the latching of the keeper 51 with the said treadle 32 being clearly shown in Figures 1 and 2 of the drawings. To free either keeper 50 or 51 from latched engagement with the treadle 32, it is necessary to manually tilt the post 45 in a forward direction and in this manner shifting the keepers 50 and 51 thereon out of the path of the said treadle.

The treadle latching mechanism comprises a pair of upstanding laterally swinging latching jaws 58 pivotally supported in spaced relation to each other at 59 next to their lower ends in a cross bar 60 fixed transversely upon the rib 48 beneath the platform 26 while straddling this rib is a foot pedal 61 horizontally pivoted at 62 beneath the platform 26 while its foot stirrup 63 rises above said platform through a clearance 64 therein. This pedal 61 overhangs a saddle bar 65 engaged with a pair of vertical pull pins 66 slidable through the cross bar 60 and secured in a coupling bar 67 having elongated slots 68 therein for receiving cross bolts 69 carried in lateral wings 70, these being in pairs spaced from each other and accommodating therebetween the coupling bar 67. The pull pins 66 between the cross bar 60 and the coupling bar 67 have about the same coiled compression springs 71 functioning to normally hold the latching jaws 58 engaged with combined striker and keeper members 72 fixed to the arms 31 of the treadle 32 within the clearance 39 between the tread planks 38 of said treadle and thus the treadle so engaged will be held latched with the keeper 51 on the post 45 and the scraper blade 28 in ground working position. When the pedal 63 is manually depressed, the jaws 58 will be unlatched from the arms 31 of the treadle 32 so that when the post 45 has been moved forwardly to shift the keepers 50 and 51 out of the path of this treadle 32 by operating the lever 42 the treadle 32 will become raised bringing it into a position for the engagement of the keeper 51 on the post 45 therewith and thus the blade 28 will be out of ground working position.

The latching jaws 58 are formed with the beveled faces 73 for coacting with the beveled portions 74 of the strikers 72 so that when pressure is applied to the tread planks 38 of the treadle 32 the latter on the lowering thereof will be caused to snap into latched engagement with the jaws 73, this, of course, being effected subsequent to the swinging of the post 45 forwardly to have the keeper 59 cleared from engagement with the said treadle 32 when the latter is in raised position and the blade 28 inactive for ground working purposes. The latching of the treadle 32 by the jaws 58 brings the blade 28 into ground working position and in this position will be latched or locked.

In the draft of the leveler, when the blade 28 is in ground working position, the land will be scraped and the rollers B having traction on the ground surface will not retard the advancement of the leveler during the operation thereof for the leveling of the land. An operator of the leveler stands upon the platform 26 and operates the treadle 32, pedal 63, lever 42 and post 45 in accordance with requirements of adjustment of the leveler. By pressing upon the treadle 32 the blade 28 on the carrier 27 therefor can be caused to penetrate the land or ground and the automatic latching of this treadle with the keeper 51 holds the scraper in ground working position.

The foremost end of the frame A has suitable draft rigging connected therewith, a portion of the rigging being indicated at 75 for the advancement of the leveler over the land or ground for leveling operation.

Carried by the treadle 32 are pivotally mounted shims 76 and 77, respectively, these being normally held out of action by releasable pins 78 and the purpose of said shims is to bring the same into position to coact with the jaws 73 and also with the keeper 51 so that the blade 28 will have minute or fine adjustment when latched by the jaws 73 with the said keeper 51, the details of the mounting of the said shims being shown in Figure 5 of the drawings.

What is claimed is:

1. A leveler of the kind described comprising a frame, fore and aft rollers journaled in said frame and each having traction slats disposed in close longitudinal relation to each other peripherally thereof, a vertically adjustable scraper supported by the frame between said rollers, a foot pedal operated locking mechanism for said scraper holding it in a determined position, means for holding the scraper in active or inactive positions, means for raising the scraper to an inactive position or lowering the same to an active position, and a swinging treadle supporting said scraper.

2. A leveler of the kind described comprising a frame, fore and aft rollers journaled in said frame and each having traction slats disposed in close longitudinal relation to each other peripherally thereof, a vertically adjustable scraper supported by the frame between said rollers, a foot pedal operated locking mechanism for said scraper holding it in a determined position, means for holding the scraper in active or inactive positions, means for raising the scraper to an inactive position or lowering the same to an active position, a swinging treadle supporting said scraper, and tread planks on said treadle.

3. A leveler of the kind described comprising a frame, fore and aft rollers journaled in said frame and each having traction slats disposed in close longitudinal relation to each other peripherally thereof, a vertically adjustable scraper supported by the frame between said rollers, a foot pedal operated locking mechanism for said scraper holding it in a determined position, means for raising the scraper to an inactive position or lowering the same to an active position, a swinging treadle supporting said scraper, tread planks on said treadle, and keepers engageable by the treadle for holding the scraper in two positions.

4. A leveler of the kind described comprising a frame, fore and aft rollers journaled in said frame and each having traction slats disposed in close longitudinal relation to each other peripherally thereof, a vertically adjustable scraper supported by the frame between said rollers, a foot pedal operated locking mechanism for said scraper holding it in a determined position, means for raising the scraper to an inactive position or lowering the same to an active position, a swinging treadle supporting said scraper, tread planks on said treadle, keepers engageable by the treadle for holding the scraper in two positions, and means active for urging the keepers into the path of movement of the treadle.

5. A leveler of the kind described comprising a frame, fore and aft rollers journaled in said frame and each having traction slats disposed in close longitudinal relation to each other peripherally thereof, a vertically adjustable scraper supported by the frame between said rollers, a foot pedal operated locking mechanism for said scraper holding it in a determined position, means for raising the scraper to an inactive position or lowering the same to an active position, a swinging treadle supporting said scraper, tread planks on said treadle, keepers engageable by the treadle for holding the scraper in two positions, means active for urging the keepers into the path of movement of the treadle, and draft links connected with the frame and with the said scraper.

6. A leveler of the kind described comprising a frame, fore and aft rollers journaled in said frame and each having traction slats disposed in close longitudinal relation to each other peripherally thereof, a vertically adjustable scraper supported by the frame between said rollers, a foot pedal operated locking mechanism for said scraper holding it in a determined position, means for raising the scraper to an inactive position or lowering the same to an active position, a swinging treadle supporting said scraper, tread planks on said treadle, keepers engageable by the treadle for holding the scraper in two positions, means active for urging the keepers into the path of movement of the treadle, draft links connected with the frame and with the said scraper, and a draft rigging in front of the frame.

REX D. HAYCOCK.
ALMA L. TURNER.